United States Patent [19]

Searle et al.

[11] Patent Number: 5,849,146
[45] Date of Patent: Dec. 15, 1998

[54] FRICTION WELDING APPARATUS

[75] Inventors: John G. Searle; John P. Searle, both of Hednesford; Frederick J. Harris, Birmingham; John G. Beresford, Brownhills, all of Great Britain

[73] Assignee: Rolls-Royce PLC, London, England

[21] Appl. No.: 898,107

[22] Filed: Jul. 22, 1997

[30] Foreign Application Priority Data

Aug. 14, 1996 [GB] United Kingdom .................... 9617047

[51] Int. Cl.⁶ .................................................. B23K 20/12
[52] U.S. Cl. ............................ 156/580; 156/73.5; 228/2.1
[58] Field of Search ................................. 156/73.5, 73.6, 156/580, 580.2; 228/2.1, 112.1, 113

[56] References Cited

U.S. PATENT DOCUMENTS

| | | | |
|---|---|---|---|
| 3,614,828 | 10/1971 | Maurya et al. | 228/114 |
| 3,840,168 | 10/1974 | Searle et al. | 228/2.1 |
| 4,844,320 | 7/1989 | Stokes et al. | 228/102 |
| 4,905,883 | 3/1990 | Searle | 228/2.1 |
| 4,995,544 | 2/1991 | Searle | 228/2.1 |
| 5,100,044 | 3/1992 | Searle | 228/112.1 |
| 5,188,279 | 2/1993 | Joyce et al. | 228/113 |

FOREIGN PATENT DOCUMENTS

A-360 512  3/1990  European Pat. Off. .
A-481125   4/1992  European Pat. Off. .

*Primary Examiner*—James Sells
*Attorney, Agent, or Firm*—Oliff & Berridge, PLC

[57] ABSTRACT

The frictional loads involved in a friction welding operation, for joining metal parts, may be several tons and the mass of the welding apparatus is correspondingly large. Thus, in addition to the energy which is converted into heat at the weld interface a substantial amount of work has to be done simply to overcome the inertial loads of the apparatus. An inertial load cancelling system is proposed in which a double acting gas spring arrangement is coupled to the welding oscillator output so that the work done in overcoming the inertia of the apparatus is returned to the system when the oscillator motion is reversed at the ends of each stroke. Thus, after the initial system input the oscillator has only to supply work to overcome internal frictional and that converted to frictional heat at the weld joint interface.

9 Claims, 3 Drawing Sheets

Fig.3a.

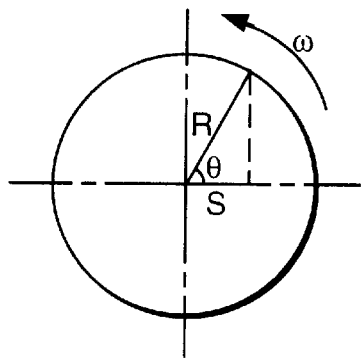

S = STROKE
$\omega = 2\pi f$
f = FREQUENCY CYCLES/SEC
R = RADIUS OF S.H.M. CIRCLE
W = MASS OF RECIPROCATING PARTS
$F\chi$ = INERTIAL LOAD CAUSED BY ACCELERATION OF RECIPROCATING PARTS

Fig.3b.

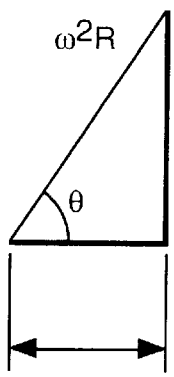

$\omega^2 \cos\theta$ = HORIZONTAL COMPT. OF ACCEL. = 'S'
BUT $R \cos\theta = S$
$\therefore \omega^2 S$ = HORIZ. COMPT. OF ACCEL.

Fig.3c.

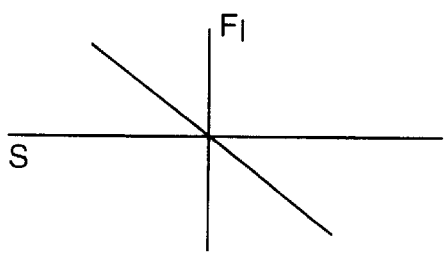

$F_I = \omega^2 S \times W$ $F_1$ IS LINEAR AGAINST S. ACCUMULATOR PRESSURE IS VIRTUALLY LINEAR AGAINST S PROVIDED THAT THE GAS VOLUME IS LARGE

FRICTION WELDING APPARATUS

BACKGROUND OF THE INVENTION

The invention relates to friction welding apparatus.

The invention is particularly concerned with the drive arrangements for friction welding machines especially linear friction welding machines as will be illustrated and described hereinafter with respect to a particular embodiment, but the invention will find application also in other kinds of friction welding machine.

In the method of generating heat for friction welding two workpieces together, one of the workpieces is caused to reciprocate relative to the other workpiece while in contact at the location of the joint. When sufficient heat has been generated at the joint interfaces the relative reciprocatory motion is ceased and the workpieces are pressed together so that they become welded together at the interfaces. In a usual arrangement of friction welding apparatus one of the workpieces is held stationary by being clamped to a fixed worktable. The other workpiece is clamped in a tooling fixture carried on a movable member or arm. The forces involved can be considerable especially when the workpieces to be welded together are made of metal and substantial force has to be employed to generate the friction needed to reach the required welding temperature.

The friction generating force and the weld pressure force are in a direction generally perpendicular to the plane of the weld joint interface while the forces creating the reciprocatory motion are parallel to the joint interface plane.

In the case of welding metal to metal these forces reach several tons and these have to be exerted and reacted by the welding apparatus and associated tooling. Furthermore, the reciprocatory parts of the apparatus have to be suitably massive and must be accelerated, stopped and reversed twice in each cycle of movement. As a result the driving forces are large, inertia forces arising from the mass of the apparatus itself are similarly large and the consequential imbalance forces of corresponding magnitude. These forces are linked together in an escalating spiral creating a problem of increasing mass of the apparatus seemingly disproportionate in relation to the size and mass of the components to be welded. The present invention seeks to provide a solution to this problem by effectively cancelling the inertia loads inherent in the friction welding apparatus.

SUMMARY OF THE INVENTION

Therefore, according to the present invention there is provided friction welding apparatus comprising a worktable mounted for reciprocatory movement coupled to a driven member arranged, in use, to execute simple harmonic motion at a chosen welding frequency, wherein coupling means coupling the driven member to the worktable includes inertial load cancelling means adapted to store and release energy alternately at a frequency equal to the frequency of the simple harmonic motion.

The inertial load cancelling means may be arranged to have a natural frequency of oscillation equal to the chosen welding frequency. However, it is not essential for these frequencies to be co-incident since the inertial load cancelling system is operative over a broad range of frequencies. It is further preferred to arrange for the natural frequency of the inertial load cancelling means to be tunable.

BRIEF DESCRIPTION OF THE DRAWINGS

The invention and how it may be carried into practice will now be described with reference to a preferred embodiment illustrated in the accompanying drawings, in which.

DETAILED DESCRIPTION OF PREFERRED EMBODIMENTS

Figure 1:
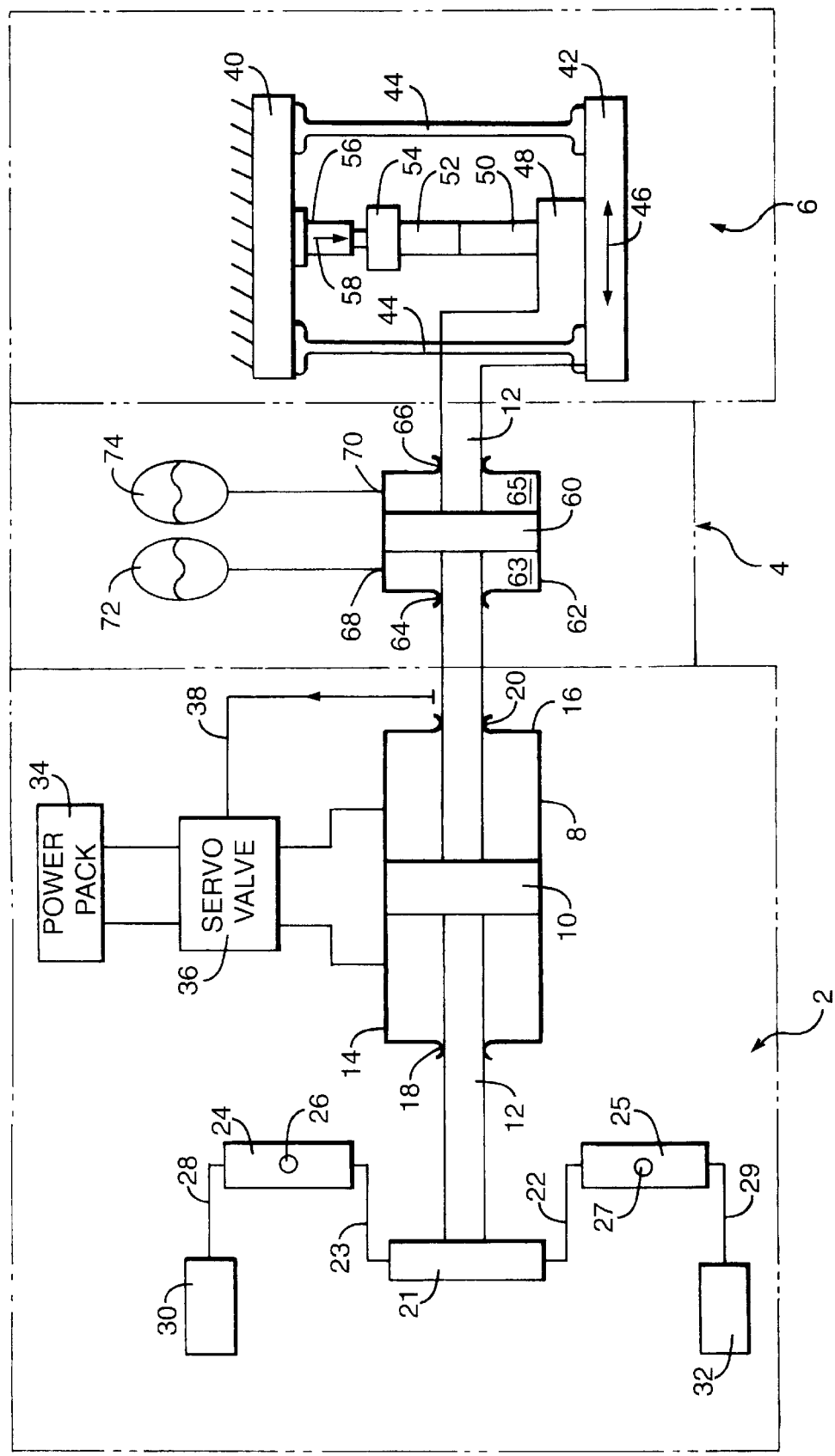
FIG. 1 shows a schematic illustration of a first embodiment of a friction welding apparatus embodying an inertial load cancelling system employing an hydraulic oscillator.

Referring first to FIG. 1 there is shown in schematic outline friction welding apparatus notionally sub-divided, for present descriptive purposes, into three general areas of an oscillator at 2, an inertial load cancelling system at 4 and a welding fixture and tooling at 6.

In this first embodiment the oscillator 2 comprises an hydraulic motor consisting of a double-acting hydraulic cylinder 8 with an internal sliding piston 10 carried on a rigid, axially moving output rod 12. The rod 12, also referred to a driven member extends axially through closed end walls 14,16 at opposite ends of the cylinder 8 through hydraulic seals 18,20 respectively. One end of the rod 12 coupled through the inertial load cancelling means 4 to the reciprocable, moving welding tooling 6. The opposite end of the rod 12 is connected to a balancing arrangement in which the rod 12 is coupled to a beam 21 carried transversely with respect to the longitudinal axis of the rod. Opposite ends of the beam 21 are connected by means of flexible blades 22,23 to rocking levers 24,25 which are pivoted to a fixed stationary apparatus frame at 26,27 respectively. The opposite ends of levers 24,25 are connected by means of further flexible blades 28,29 to reciprocable balance weights 30,32. These balance weights 30,32 consist of two equal weights the total mass of which is equal to the total mass of the reciprocating parts of the apparatus. The weights 30,32 are mounted on sliding blocks to execute reciprocal motion in the direction of the axis of rod 12. Thus, the balance weights 30,32 provide dynamic balancing of the reciprocatory parts of the oscillator 2, the inertial load cancelling system 4 and of the reciprocating parts of the tooling 6.

The oscillator 2 is driven by a source 34 of pressurised hydraulic fluid connected via a servo valve 36 to either side of the piston 10 in cylinder 8. The servo valve 36 is operated by a servo connection 38 to switch hydraulic pressure alternately between opposite sides of the cylinder 8 in synchronism with the motion of the rod 12.

The apparatus includes a rigid stationary frame, of which only a portion is shown in FIG. 1 at 40. The fixed part 40 which for present purposes may be considered to be a flat plate, constitutes a baseplate for the welding fixture and tooling. A movable element 42 is coupled to the baseplate 40 by flexible connecting means 44 and is mounted in guide means (not shown) with two degrees of freedom of movement in the plane of the drawing so that the element 42 is constrained to reciprocate in the direction of the arrow 46. The flexible connecting means 44 preferably comprises a plurality, two pairs, of flexible metal blades. The blades 44 are attached at one end to the element 42 and anchored at their opposite ends to the fixed baseplate 40. The reciprocable element 42 is coupled to the distal end of the driven member 12 so that, in operation, it is caused to reciprocate by the simple harmonic, linear reciprocation of member 12.

Carried on movable element 42 is clamping means, generally indicated at 48, which holds one of the workpieces 50 which is to be welded to another workpiece 52. The workpiece 52 is mounted on a worktable 54 which is carried by a ram 56 arranged to exert friction generating and weld pressure forces in the direction of arrow 58 thus urging an end face of workpiece 52 against an opposite end face of workpiece 50.

In operation, the workpieces 50,52 are mounted in the welding tooling with end faces in abutting engagement. The driven member 12 is set in motion and simultaneously the ram 56 is energised to exert a friction generating force of several tonnes at the interface of the workpiece. Movement of the reciprocable element 42 is accommodated by flexure of the blades 44 during the frictional heating phase. When sufficient heat input has been reached the moving elements are halted at a zero position, i.e. the required weld position, whereupon the force exerted by ram 52 is maintained for a period of time while the weld interface is created. Usually this weld pressure force although still several tonnes is slightly less than the friction generating force.

Forces in the friction generating, weld pressure direction of arrow 58 are contained and reacted by the weld tooling fixture and mountings of reciprocable element 42. The forces in the directions of arrow 46 which produce the desired reciprocating motion are of present interest. These forces comprise the forces needed to accelerate and decelerate the whole reciprocating mass of the apparatus, that is the inertia of the apparatus, and to overcome the frictional forces generated as a result of the pressure exerted by ram 56 plus the much lower inherent frictional resistance of the apparatus.

During each cycle of the harmonic motion part of the energy input to the hydraulic actuator system is cyclically converted into kinetic energy of the moving parts of the apparatus which is potentially lost by braking and reversing the motion of the parts at the beginning the end of each half cycle. The inertia load cancelling system 4 is intended to recoup this otherwise lost work. The inertia load cancelling system 4 comprises a second double-acting cylinder and piston arrangement.

A second piston 60, rigidly attached to the oscillator output rod 12, is slidably encased in a second cylinder 62 the end faces of which are sealed at 64,66 to the rod 12. Thus, the cylinder volume is divided into two opposed working regions 63,65 swept by the piston 60 in counter-phase. Ports 68,70 are provided towards opposite ends of the cylinder 62 and these communicate respectively with two gas pressure hydraulic accumulators 72,74. The working volumes 63,65 of the cylinder 62 are filled with an hydraulic fluid which also partly fills the accumulators 72,74. The remaining volume of the accumulators is filled with a gas under pressure, e.g. nitrogen. Thus the accumulators may be used to store energy by compression of the gas volume by forcing more hydraulic fluid into the accumulator volume. The same energy may be subsequently recovered by permitting the compressed gas to expel the hydraulic fluid. The mechanical/hydraulic parts of this system should be non-elastic, that is, have sufficient mechanical stiffness, so that the compression of the gas and recovery of the stored energy is as efficient as possible.

In operation, piston 60 sweeps the cylinder volume in harmonic motion in exact synchronism with the motion of rod 12 driven by the oscillator 2, alternately forcing fluid into the accumulators 72,74 and from the working regions 63,65 of the cylinder 62. As piston 60 moves towards the right in the drawing of FIG. 1 fluid is displaced from volume 65 into accumulator 74 further compressing the gas contained in the accumulator. Thus, energy is stored in the accumulator 74, in the form of the increased gas pressure, as a result of the work done by the piston 60 in compressing the gas. The effect of taking work out of the oscillator member 12 is this way is to brake the moving parts of the welding apparatus. At the end of each stroke kinetic energy arising due to the inertia of the system is converted into potential energy of increased gas pressure in the accumulator 74. This potential energy is then returned to the system on the return stroke, by the compressed gas expanding and forcing fluid from the accumulators in the cylinder volume 65, as work done in accelerating the moving parts of the apparatus. At the same time the same process of energy interchange occurs between the accumulator 72 and the working volume 63, but in anti-phase. Thus, subject to the loss of energy doing work to overcome internal friction, work done by the oscillator is not dissipated in reversing mechanical movement of the welder.

The accumulators function as gas springs and after an initial energy input the system will tend to oscillate at a natural frequency damped by its internal friction. Thereafter the oscillator 2 merely has to supply work to overcome friction at the weld joint interface, which is converted into heat energy at the interface, and to overcome the internal friction of the system. Mathematical formulae which describe these system characteristics are summarised in FIGS. 3a, 3b and 3c. The concluding equation also depicted graphically in FIG. 3c shows that providing the volumes of the gas accumulators is large, relative to the swept volumes of the cylinder 62 then the inertia forces are, for practical purposes, a linear function of the oscillator stroke.

Figure 2:
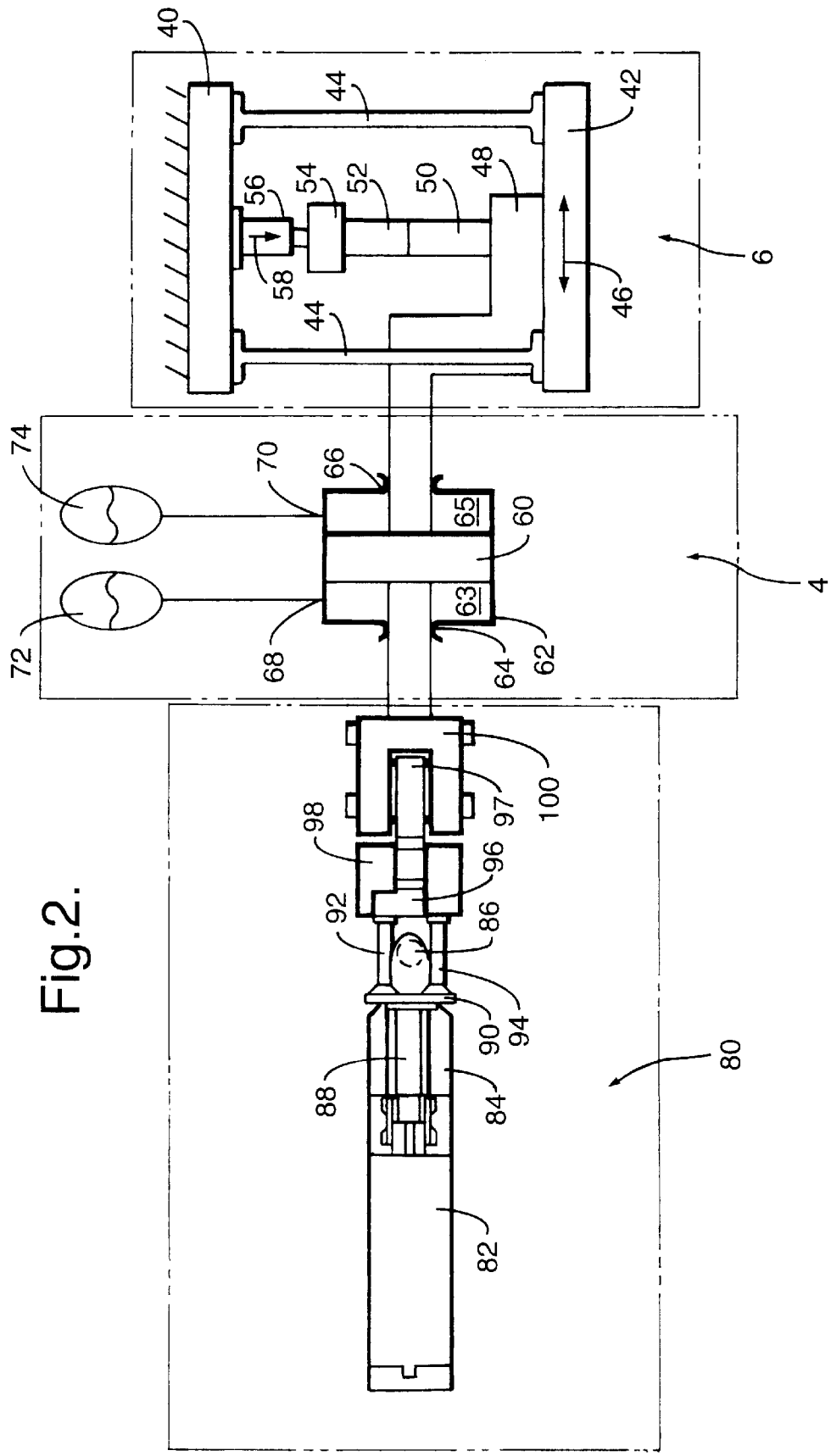
FIG. 2 shows a similar illustration of a second embodiment employing an electro-mechanical oscillator, and FIGS. 3a, 3b and 3c contain a summary of mathematical formulae representing the characteristics of the welding apparatus and inertial load cancelling system.

FIG. 2 shows a schematic illustration of a second embodiment of the invention comprising an alternative oscillator drive arrangement of the kind described in our co-pending GB patent application no 9526038.6. The components comprising the inertial load cancelling means 4 and welding fixture and tooling 6 are basically unchanged and in comparison with the first embodiment of FIG. 1 like parts carry like references. This kind of oscillator is fully described in the above mentioned patent application, therefore an abbreviated description only is given hereinafter.

This second oscillator is generally indicated by reference 80 in FIG. 2. As before its purpose is to produce a reciprocal drive to rod 12, but it does so in more compact form as compared to the hydraulic oscillator and it incorporates inherent dynamic balancing of the reciprocating parts of the whole system.

Briefly the oscillator 80 includes a prime mover consisting of an electric motor 82 mounted on a frame 84 which is pivoted at 86. The axis of pivot 86 is arranged orthogonally relative to the rotational axis of the motor drive shaft 88. The shaft 88 drives a flywheel 90 which has two flexible elements, or blades, 92,94 mounted on its opposite face towards opposite ends of a diameter. The blades 92,94 are joined respectively to a crank 96 and a co-axial balance weight 98 at locations radially offset from their mutual axis of co-rotation. The balance weight 98 takes the form of a cylinder journalled on the crank 96 which has an integral axially extended part 97 which is engaged with a cylindrical oscillator output member 100. The extended part 97 of crank 96 is rotatably engaged with the interior of the cylindrical output member 100 by means of thrust bearings (not shown) which may be ball bearings. The outside surface of the member 100 has a plurality of sliding keys (not shown) which slidably engage in keyways (not shown) carried on a fixed part of the frame of the apparatus. Thus, the crank 96 and its extension 97 are free to rotate within the output member 100 but are capable of driving it axially to reciprocate by sliding in the keyways. The direction of this reciprocation is arranged in the axial direction of motion of the rod 12.

In operation, when motor 82 is energised it drives the flywheel to rotate the crank 96 and concentric balance weight 98 via the bending elements 92,94. When the motor shaft axis is co-axial with the crank axis the axis of rotation of the flywheel 90 coincides with the axis of crank 96 and the bending elements simply turn with the flywheel. However, if the motor frame is turned through a small angle at pivot 84 the flywheel axis becomes tilted and the bending elements 92,94 alternately push and pull the crank and balance weight as they revolved around the crank axis. This movement produces reciprocating axial motion of the output member 100 the amplitude of which is a function of the angular offset of the motor frame about pivot 86. Since the weight 98 is subject to axial reciprocation in anti-phase to the motions of the oscillator output rod 12, and therefore the moving parts of the welding tooling also, then it can be used to dynamically balance the whole system.

The inertial load cancelling system 4 and welding tooling 6 as shown are identical with the similarly numbered arrangements of the first embodiment illustrated in FIG. 1. Thus, the oscillator output rod 12 is coupled to the piston 60 of the inertial load cancelling system which functions in the same manner as described above.

It will be appreciated that the arrangement described above is given by way of example only and that certain changes may be introduced in adapting the invention for use in conjunction with practical embodiments of friction welding apparatus. In particular, it may be necessary in practice to employ more than two gas accumulators. It will also be understood that the response time of the inertia load cancelling system is important and is preferably as short as possible, and commensurate with typical welding oscillator frequencies of up to several hundred hertz. The exact welding oscillator frequency is chosen to suit a range of materials and workpiece sizes within this welding oscillator frequency range so the inertia load cancelling system is preferably tunable to match. This may be achieved by varying the oil or gas volume or both, that is the effective spring rate. For example doubling the volume effectively halves the spring rate. Further control may be achieved by actuated valves in the communication ports 68,70 between the cylinder(s) 62 and the gas accumulators 72,74. Also the port sizes may be altered or varied to match a desired oscillator frequency for individual welding operations.

What is claimed is:

1. Friction welding apparatus comprising a worktable mounted for reciprocatory movement coupled to a driven member arranged, in use, to execute simple harmonic motion at a chosen welding frequency, wherein coupling means coupling the driven member to the worktable includes inertia load cancelling means adapted to store and release energy alternately at a frequency equal to the frequency of the simple harmonic motion.

2. Friction welding apparatus as claimed in claim 1 wherein the inertial load cancelling means is arranged to have a natural frequency of oscillation equal to the chosen welding frequency.

3. Friction welding apparatus as claimed in claim 1 wherein the natural frequency of the inertial load cancelling means is tunable.

4. Friction welding apparatus as claimed in claim 1 wherein the inertial load cancelling means comprises means for storing and releasing energy alternately in opposite half-cycles of the simple harmonic motion of the driven member.

5. Friction welding apparatus as claimed in claim 4 wherein the means for storing and releasing energy utilises pressure in a working fluid.

6. Friction welding apparatus as claimed in claim 4 wherein the inertial load cancelling means comprises a plurality of fluid accumulators each of which is interconnected with a working fluid chamber from which the fluid is displaced in accordance with the motion of the driven member.

7. Friction welding apparatus as claimed in claim 6 wherein a movable piston within the working fluid chamber is coupled to the driven member for co-linear movement therewith.

8. Friction welding apparatus as claimed in claim 7 wherein the piston is carried on the driven member.

9. Friction welding apparatus as claimed in claim 5 wherein the working fluid is gas.

* * * * *